March 13, 1928.

C. T. EVANS 1,662,243

CONTROLLER FOR ELECTRIC MOTORS

Original Filed May 8, 1922

*INVENTOR.*
Clarence T. Evans
BY Frank W. Hubbard
*ATTORNEY.*

Patented Mar. 13, 1928.

1,662,243

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

Application filed May 8, 1922, Serial No. 559,187. Renewed August 4, 1924.

This invention relates to controllers for electric motors, particularly direct current motors.

More particularly the invention relates to controllers of that type disclosed in my copending application, Serial No. 283,087, filed March 17, 1922, which has matured into Patent No. 1,479,033, issued Jan. 1, 1924, to the Cutler-Hammer Mfg. Co., of Milwaukee, Wisconsin, a corporation of Wisconsin, as assignee, wherein means are provided to insure delayed accelerating operation. The controller therein disclosed comprises accelerating switches having lockout windings and one or more transformers to be connected in circuit with the controlled motor to supply transient currents to the lockout windings of the accelerating switches as a function of the variations in motor current incident to acceleration and to other current variations due to commutations of the motor connections without dependence upon the peaks in motor current. The controller thus affords a definite minimum delay incident to each step of acceleration such delay being augmented by the surge in motor current incident to the previous step of acceleration or initial completion of the motor circuit as the case may be.

The present invention has among its objects to provide a simplified controller of the aforesaid character.

A further object is to provide a controller wherein a minimum number of inductive windings are required, and wherein such windings if arranged in a mutually inductive relation may be used alternately as primary and secondary.

Another object is to provide a controller of the aforesaid character wherein the desired sequence of operation of the accelerating switches may be insured without employment of the usual interlocking contacts.

Various other objects and advantages of the invention will hereinafter appear.

The accompanying drawings illustrate certain embodiments of the invention which will now be described, it being understood that the embodiments illustrated are susceptible of various modifications without departing from the scope of the appended claims.

In the accompanying drawings.

Figure 1:
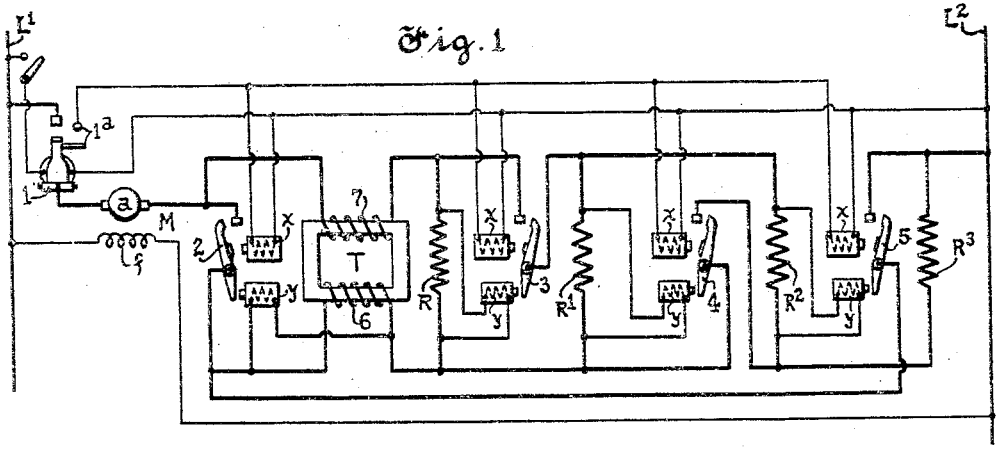
Figure 1 is a diagrammatic view of the preferred form of controller.

Referring to Fig. 1 of the drawings the controller is employed in connection with a direct current motor M having an armature $a$ and a shunt field winding $f$. However, it is to be understood that the motor might be of any other preferred type.

This controller includes a main switch 1 to connect the motor armature across the lines $L'$ and $L^2$ through starting resistances R, $R'$, $R^2$, and $R^3$ in series, it being understood that the main switch 1 which is shown as single pole may be replaced by a double pole switch or a pair of reversing switches and that any number of starting resistances may be employed. Also the controller includes switches 2, 3, 4 and 5 to shunt resistances R, $R'$, $R^2$ and $R^3$ respectively.

Each of the resistance controlling switches is illustrated as of the so-called lockout type being provided with a shunt operating winding $x$ and a lockout winding $y$. The shunt windings of the several switches are arranged to be connected across the line in parallel by auxiliary contacts $1^a$ of the main switch upon closure of the latter switch to complete the motor circuit. Accordingly all of the resistance switches tend to respond upon completion of the motor circuit but switches 3, 4 and 5 have their lockout windings normally energized to effect positive lockout thereof. More particularly each of switches 3, 4 and 5 as shown has its lockout winding in parallel with the resistance controlled by the preceding accelerating switch and each of said lockout windings is so proportioned relatively to its respective parallel resistance that the drop across the latter when included in series with the motor will insure adequate energization of the former for lockout action thereof. Accordingly response of each of switches 3, 4 and 5 is positively prevented until closure of the preceding switch to shunt the step of resistance paralleling its respective lockout winding whereby sequential operation of the accelerating switches is insured without requirement of the usual interlocking contacts. In this connection it is to be noted that the lockout windings of switches 3, 4 and 5 might be connected in series with resistances R, R' and R² respectively to the same end but the arrangement described is preferred where the motor current is of relatively high value.

The lockout coil of switch 2 is connected to winding 6 of a transformer T, said transformer having a second winding 7. The winding 7 of the transformer is connected between the motor armature and resistance R and is thus subjected to the initial surge of motor current and in consequence induces a current in winding 6 which is supplied to the lockout winding $y$ of switch 2. The transient current thus supplied to the lockout winding of switch 2 will effect a definite delay in response of said switch.

Figure 2:
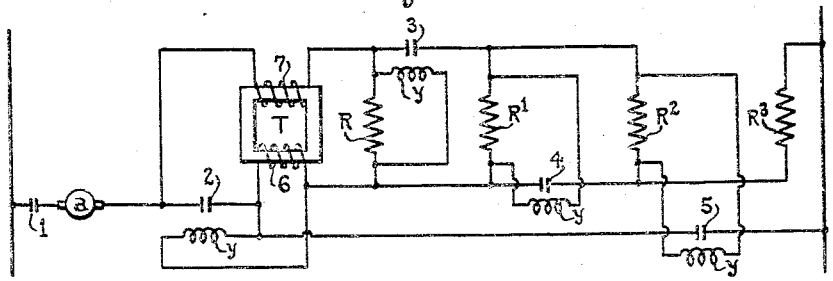
Fig. 2 is a simplified diagram showing the motor armature connections of Fig. 1.

Closure of switch 2, as more clearly exemplified in the simplified diagram, Fig. 2, connects the motor armature across the line through the winding 6 of the transformer and resistances R', R² and R³ in series, thereby shunting the resistance R and transformer winding 7. Thus closure of switch 2 tends to denergize the lockout winding of switch 3 which parallels resistance R but due to the inductive effect of the transformer winding 7 the supply of current to said lockout winding is momentarily maintained and in the meantime the transformer winding 6 which is wound oppositely to the winding 7 induces a current in the latter winding which further tends to maintain said lockout winding energized. Accordingly switch 3 is prevented from responding until the current thus induced in its lockout winding is reduced to a given value.

In this connection it will be noted that closure of switch 2 subjects the transformer winding 6 to a current increasing from zero value whereby the transient current induced and supplied to the lockout winding of switch 3 insures a definite minimum delay in response of said switch irrespective of the peak in motor current incident to exclusion of resistance R. On the other hand the peak in motor current due to exclusion of resistance R tends to prolong the period of delay in release of switch 3, but the effect of such peak in motor current is necessarily transient thus precluding the possibility of arrest of switch 3 for any protracted period.

Switch 3 in closing connects the motor armature across the line through the transformer winding 7 and resistances R² and R³ in series thus shunting resistance R' and transformer winding 6 and consequently tending to release switch 4 for response thereof. However, the transformer functions as above described but in a reverse manner to maintain the lockout winding of switch 4 energized for a given minimum period subject to a slight increase as described in connection with switch 2.

Closure of switch 4 connects the motor across the line through the switch 2, transformer winding 6 and resistance R³ in series, thus shunting resistance R² and transformer winding 7, and consequently tending to release switch 5 for response thereof. On the other hand the transformer is again caused to function as described but with its winding 6 acting as the primary thereof to maintain the lockout winding of switch 5 energized for a given minimum period subject to a slight increase as described in connection with switches 2 and 3. Switch 5 is thereupon permitted to respond.

Closure of switch 5 connects the motor armature directly across the line through switch 2 thereby shunting all of the starting resistances and both transformer windings.

As above set forth each of the transformer windings tends to maintain the lockout windings connected thereto energized for arrest of their respective switches without dependence upon the mutual inductance of said transformer windings. Accordingly it would be possible to provide the windings 6 and 7 with independent magnetic circuits and yet obtain time limit control of switches 3, 4 and 5 as a function thereof although the arrangement thereof in a mutually inductive relation is preferred since the inductive effect of each winding upon the other increases the time element incident to response of each switch. Further this arrangement affords time limit control of switch 2 which would require special control if the windings 6 and 7 were independent. Also it is possible to connect the lockout winding of switch 3 across the transformer winding 7 but the arrangement illustrated is preferred since the transient current supplied by transformer winding 7 will traverse said lockout winding in the same direction as the line current. This is manifestly very desirable and it will be noted that the connections shown make similar provision for the remaining lockout windings.

Figure 3:
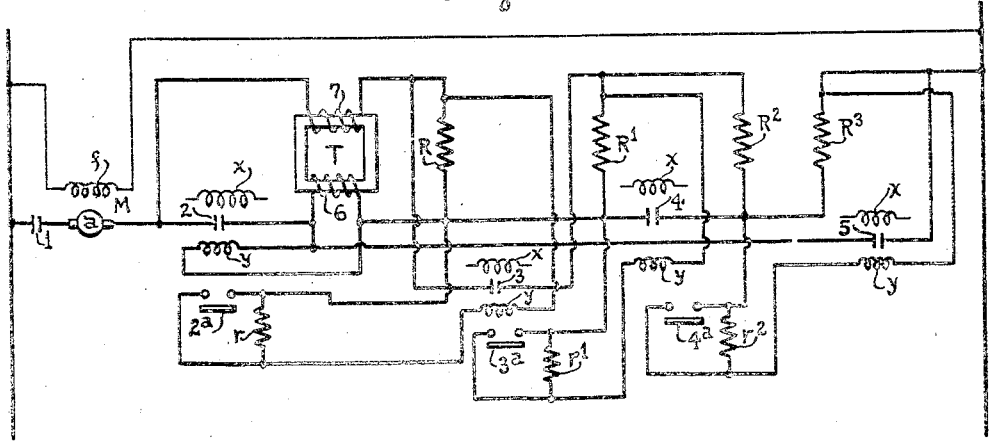
Fig. 3 is a diagrammatic view of a modified form of the controller.

Referring to Fig. 3 the same shows a system like that described with certain additions to facilitate design of the lockout windings with respect to the resistances with which they are paralleled.

More specifically the lockout winding of switch 3 has included in series therewith a resistance $r$ to be excluded from circuit by auxiliary contacts 2ᵃ of switch 2 upon response of said switch. The lockout winding of switch 3 may thus be designed relative to resistance R for the desired coaction thereof during functioning of the transformer, without regard to its protection during the first step of acceleration, such protection being afforded by the resistance $r$ which is excluded from circuit upon response of switch 2.

Similarly the lockout windings of switches 4 and 5 are provided with resistances $r'$ and $r^2$ respectively adapted to be short-circuited by auxiliary contacts $3^a$ and $4^a$ of switches 3 and 4 respectively.

What I claim as new and desire to secure by Letters Patent is:

1. In a motor controller, in combination, accelerating means, and means to arrest for temporary periods the accelerating action of the former means in different stages thereof, the latter means including inductive windings and commutatable connections providing for inclusion of said windings in circuit alternately as acceleration progresses.

2. In a motor controller the combination with accelerating switches to be operated in sequence, said switches having individual lockout coils, of inductive windings to supply respectively transient currents to the lockout coils of different switches, and commutatable connections for said windings providing for inclusion thereof alternately in the motor circuit as acceleration progresses.

3. In a motor controller, in combination, accelerating means and means to arrest for temporary periods the accelerating action of the former means in different stages thereof, the latter means including windings arranged in an inductive relation and commutatable connections therefor to cause the same to act alternately one upon the other as the accelerating action of the first mentioned means progresses.

4. In a motor controller, in combination, accelerating means and means to arrest for temporary periods the accelerating action of the former means in different stages thereof, the latter means including windings arranged in an inductive relation and circuit connections therefor commutatable by said accelerating means to cause said windings to act alternately one upon the other in successive stages of acceleration.

5. In a motor controller in combination, accelerating means and means to arrest for temporary periods the accelerating action of the former means in different stages thereof, the latter means including windings arranged in an inductive relation and commutatable connections for said windings to cause either to act upon the other as a function of the commutations of such connections.

6. In a motor controller in combination accelerating means and means to arrest the accelerating action of the former means in different stages thereof, the latter means including windings arranged in inductive relation and commutatable connections to subject said windings alternately to the motor current as the accelerating action progresses to effect supply of transient currents by said windings alternately.

7. In a motor controller in combination a plurality of accelerating switches operable sequentially, said switches having individual lockout coils and inductive means to supply transient currents to the lockout coils of said switches, said means including windings respectively connected to the lockout coils of different accelerating switches and commutatable connections for said windings to cause either to act inductively on the other for energization of the lockout coil connected to the latter.

8. In a motor controller in combination accelerating switches to operate sequentially, said switches having individual lockout coils and inductive means to supply transient currents to said lockout coils, said means including windings arranged in an inductive relation and respectively connected to the lockout coils of different accelerating switches, said windings being subjected alternately to the motor current to act alternately one upon the other.

9. In a motor controller in combination, resistance for the motor circuit, switches controlling said resistance for acceleration of the motor, said switches having individual lockout coils co-ordinated with said resistance to delay operation of certain of said switches pending operation of other of the same and means including a transformer to supply said coils with transient currents to further delay operation of their respective switches.

10. In a motor controller in combination a plurality of starting resistances for the motor to be excluded from circuit sequentially, a plurality of switches controlling different resistances, certain of said switches each having a lockout coil connected to the resistance preceding the resistance controlled thereby, whereby operation of such switch is dependent upon prior operation of another of said switches and means including a transformer to supply a transient current to the lockout coil of said switch to further delay operation thereof.

11. In a motor controller in combination a plurality of resistances to be excluded from circuit sequentially, switches for excluding different resistances, each of said switches having a lockout coil, the lockout coils of all but one of said switches being respectively connected to the resistances to be excluded prior to the resistances controlled by said switches respectively and an inductive device having windings to be connected respectively to the lockout coils of alternate switches and connections subjecting said windings to the motor current for acting alternately one upon the other.

12. In a controller, in combination, progressively operable switches and arresting means for said switches comprising inductive windings and commutatable connections whereby first one and then the other of said windings is included in circuit to supply transient currents.

13. In a controller, in combination, progressively operable switches and arresting means for said switches comprising inductive windings and commutatable connections whereby first one and then the other winding is included in circuit to supply transient currents and whereby the main and induced currents traversing each winding pass therethrough in the same direction.

14. In a controller, in combination, a switch having a restraining winding, commutatable connections to subject said winding to a current for prolonged delay in operation of said switch and means including a transformer whereby said winding is subjected to a transient current inductively derived from the former current upon commutation of said connections.

15. In combination, a motor, an accelerating switch having a restraining winding temporarily subjected to motor current and means including a transformer whereby said winding is insured supply of a transient current inductively derived from the motor current for further restraint of said switch.

16. The combination with an electric motor, of a resistance therefor to be excluded in steps and means for excluding a step of said resistance and then excluding another step after a temporary delay regardless of the instantaneous value of the motor current, said means including an electromagnet connected in shunt with the first mentioned step of resistance to be energized by motor current and to be excluded from circuit together with its parallel step of resistance and said means further including an electroresponsive accelerating switch responsive to exclude the second mentioned step of resistance subject to delay only by the aforementioned electromagnet.

17. The combination with an electric motor, of a resistance therefor, means to complete the motor circuit through said resistance and to thereafter short circuit one step of said resistance and then another step thereof after a temporary delay regardless of the instantaneous value of motor current, said means comprising an electroresponsive switch to short circuit the second mentioned step of resistance and further comprising inductive time limit control means including an electromagnet connected in parallel with the first mentioned step of resistance to be short circuited therewith, said electroresponsive switch being operable subject to delay only through the medium of said electromagnet.

18. The combination with an electric motor, of a resistance therefor and electroresponsive means to exclude said resistance from circuit in steps and to exclude each step of resistance after a temporary delay regardless of the instantaneous value of the motor current, said means including a plurality of electromagnets respectively connected in shunt with certain of said steps of resistance for energization of each electromagnet by motor current and for exclusion of each from circuit together with its parallel step of resistance and said means further including electro-responsive accelerating switches certain of which are each responsive to short circuit one step of resistance subject to delay only by that one of the electromagnets aforementioned which is connected in shunt with a previously short-circuited step of resistance.

19. The combination with an electric motor, of a resistance therefor, means to complete the motor circuit through said resistance and electro-responsive accelerating means to short-circuit said resistance in steps and to short-circuit each of certain of said steps of resistance after a temporary delay regardless of the instantaneous value of the motor current, said accelerating means comprising accelerating switches to short-circuit said steps of resistance and further comprising inductive time limit control means including electromagnets connected in parallel to different steps of resistance to be short-circuited therewith, certain of said accelerating switches being operable subject to delay only through the medium of one of the electromagnets aforementioned which is in parallel with a preceding step of resistance.

In witness whereof, I have hereunto subscribed my name.

CLARENCE T. EVANS.